United States Patent [11] 3,627,680

[72] Inventor Gilbert Desbos
 Paris, France
[21] Appl. No. 76,331
[22] Filed Sept. 28, 1970
[45] Patented Dec. 14, 1971
[73] Assignee Compagnie des Eaux et de L'Ozone
 Paris, France
 Continuation of application Ser. No.
 804,257, Mar. 4, 1969, now abandoned.
 This application Sept. 28, 1970, Ser. No.
 76,331

[54] METHOD OF CLARIFYING WATER
 1 Claim, No Drawings
[52] U.S. Cl. .................................................... 210/52,
 252/181
[51] Int. Cl. ..................................................... C02b 1/20
[50] Field of Search ........................................... 210/42, 51,
 52-54; 252/180, 181

[56] References Cited
 FOREIGN PATENTS
 487,987 11/1952 Canada ........................ 210/54
 OTHER REFERENCES
 Betz Handbook of Industrial Water Conditioning, Betz Labs., Inc., 5th Ed., 1957, Phila., Pa., pp. 204, 205 and 208–212

Primary Examiner—Michael Rogers
Attorney—Waters, Roditi, Schwartz & Nissen

ABSTRACT: Water is clarified by flocculation using as a flocculation additive, a dispersion of 1 g./l. of cellulose-free sodium alginate in demineralized water titrating at less than 10° hydrotimetric. The dispersion is added to the water to be treated in an amount corresponding to 0.2–0.5 p.p.m. to alginate.

METHOD OF CLARIFYING WATER

This application is a streamlined continuation of application Ser. No. 804,257 filed Mar. 4, 1969, now abandoned.

This invention is concerned with a method of clarifying water, and, more particularly, with a method in which impurities are flocculated by means of a flocculating electrolyte, such as a salt of aluminum, iron or the like, and the water is clarified by coagulating and deposition of the floc.

It has become standard practice to use the flocculating agent proper with reagents, generally described as "flocculation additives," which act as a colloidal charge and are of very varied natures. However, none of these additives is really satisfactory. For example, activated silica, which is widely used in the United States and which is obtained by reaction between sodium silicate and sulfuric acid, is subject to the disadvantage that it necessitates the handling of dangerous chemical substances. In addition the colloidal sol obtained has a certain degree of instability which can lead to its complete gelification when the "maturing" time has passed.

The majority of the agents known as "polyelectrolytes" are toxic and cannot, therefore, be used in the treatment of drinking water.

Sodium alginate had also been used for this purpose; it is obtained by the action of caustic soda on certain species of algae and the commercial qualities available at present contain variable quantities of cellulose. In general this alginate is used in a concentration of from 2 to 4 p.p.m. in the form of a suspension which is injected into the water to be treated, the proportion used depending on the nature of the water.

One hundred percent pure sodium alginate, that is completely freed of cellulose, is commercially available and it might be thought that logically it would be more effective than the impure quality. However it has been found that the use of this pure alginate is totally ineffective in water treatment. An explanation of this surprising behavior is that this alginate, being extremely reactive, forms calcium alginate with the calcium ions present in the water and thus loses the colloidal dispersion properties for which it is used.

I have now developed a method of using pure sodium alginate as a flocculation additive in water treatment, which method conserves its high reactivity and requires the use of a much smaller amount of alginate, the required concentration of alginate being, in addition, substantially independent of the degree of contamination and the temperature of the water to be treated.

This method is based on the use of 100 percent pure sodium alginate in the form of a colloidal dispersion in demineralized water titrating at less than 10° hydrotimetric, the dispersion containing 1 g./l. of the alginate. The term "10° hydrotimetric" is used to define the degree of hardness of water. It is a conventional term in wide use in France. One hydrotimetric degree corresponds to 10 p.p.m. hardness expressed as $CaCO_3$. Thus, 10° hydrotimetric is equivalent to 100 p.p.m. of $CaCO_3$. In such a dispersion the sodium alginate remains in a very reactive form and can be injected into the water to be treated in an amount of from 0.2 to 0.5 p.p.m. to give the same results as are obtained with 10 times greater quantities of commercial impure sodium alginate.

According to the present invention, therefore, I provide a method of clarifying water by flocculation, in which a dispersion of 1 g./l. of cellulose-free sodium alginate in demineralized water titrating at less than 10° hydrotimetric is used as flocculation additive, the dispersion being mixed with the water to be treated to give a concentration of from 0.2 to 0.5 p.p.m. of alginate in the water.

In order that the invention may be more fully understood, the following examples are given by way of illustration only.

A series of samples of the same contaminated water were treated first with the usual amount of a conventional flocculating agent, the amount of the latter being the same for each sample, and then, respectively, with varying amounts of commercially available sodium alginate containing 50 percent of cellulose, this material being introduced into the water to be treated in the form of an aqueous suspension, and with, varying amounts of a 1 g./l. dispersion of cellulose-free sodium alginate in demineralized water titrating at less than 10° hydrotimetric. The cellulose-containing alginate was introduced to give concentrations of 1, 2 and 3 p.p.m. of alginate in the water and the cellulose-free alginate dispersion to give concentrations of 0.3 and 0.5 p.p.m. of alginate in the water. The coagulation time, in minutes, and the appearance of the flock, characterized in accordance with the Baylis scale, were noted in each case. The results obtained are shown in the following table.

| Alginate quality | Conc. p.p.m. | Coagulation time mins. | Appearance of flock |
| --- | --- | --- | --- |
| Commercial alginate contg 50% cellulose in suspension | 1 | 20 | AB/B |
|  | 2 | 20 | B |
|  | 3 | 20 | B/TB |
| 100% pure alginate, in colloidal dispersion | 0.3 | 10 | B |
|  | 0.5 | 5 | B/TB |

It is apparent from these results that the method according to the invention enables results comparable to those obtained at present with impure alginate, to be obtained with six to seven times less of pure alginate. Taking into account the relatively higher price of pure alginate, the saving obtained is about three to five times with respect to the actual net cost, this saving being considerable in this field having regard to the large quantities of water treated.

The present invention, therefore, enables what is, in fact, the most effective quality of alginate to be used in water treatment, this high quality alginate having hitherto been avoided because of its apparent lack of effectiveness.

I claim:

1. In a method of clarifying water which comprises flocculating impurities therefrom with a flocculating agent, an improvement comprising adding to the water to be clarified, a flocculation additive which is a dispersion consisting of 1 g. of cellulose-free sodium alginate per liter of demineralized water titrating at less than 10° hydrotimetric, said dispersion being added to the water to be clarified in an amount corresponding to a concentration of 0.2 to 0.5 p.p.m. of sodium alginate.

* * * * *